United States Patent Office 2,960,489
Patented Nov. 15, 1960

2,960,489

ARTICLES CONSISTING OF SYNTHETIC LINEAR POLYMERS AND METHOD FOR THEIR MANUFACTURE

Rudolf Gabler, Kusnacht, Zurich, and Walter Zehnder, Chur, Graubunden, Switzerland, assignors to Inventa A.G. Fuer Forschung und Patentverwertung, Zurich, Switzerland No Drawing. Filed Mar. 27, 1958, Ser. No. 724,256

Claims priority, application Switzerland Apr. 11, 1957

5 Claims. (Cl. 260—45.75)

This invention relates to the manufacture of articles such as filaments, fibers, yarns, woven goods, films, extruded articles, granules and the like which are resistant to the influence of heat and oxygen from linear synthetic polyamides.

More particularly the invention relates to a method wherein the linear polyamides are shaped into said articles in the presence of a copper salt and a hydrohalogenic acid salt of a non-volatile strong organic base.

The present invention pertains to synthetic linear polyamides as obtained, e.g., by polycondensation of ε-aminocaproic acid or its lactam, of adipic acid hexamethylene diamine, of ω-aminoundecanic acid, or of mixtures thereof. It is well known that objects made from these polyamides are subject to embrittlement on exposure to heat which renders them unusable for continuous use at temperatures above 100° C.

Numerous stabilizers are known which are said to obviate the embrittlement of the polyamides at elevated temperatures and in the presence of oxygen. As examples, certain good effects have been obtained by incorporating in the molecule copper salts (French Patent 906,893, British Patent 652,947); halogenides (East German Patent 5350); certain acids of phosphorus (U.S. Patent 2,510,777); or mixtures of the substances named above (British Patent 722,724, U.S. Patent 2,705,227). It also has been suggested to incorporate organic heat stabilizers in the polyamide molecules, e.g., amines (Dutch Patent 56,665), mercaptobenzimidazole (U.S. Patent 2,630,421), or n.n-polymethylene-bis-o-hydroxybenzamides (Dutch Patent 55,934).

A particularly effective heat stabilization is attained by combining copper salts with inorganic halogenides, as described in British Patent 722,724 and U.S. Patent 2,705,227. However, the substances covered in these patents are compatible only to a limited extent and have the tendency to form solid precipitates, so that it is impossible to copolymerize them homogeneously in a hot melt. If other methods are employed to add the stabilizers to the finished polymer, e.g., at the extruder or the calender, the stabilizers enter the system without difficulties, but additional operations are required.

It has now been found that the disadvantages described above can be eliminated by selecting stabilizers which consist of a copper salt and a hydrohalogenic acid salt of a substantially non-volatile organic base. Highly suited as the copper component are copper salts of organic acids, e.g., copper acetate, copper propionate, copper butyrate, copper stearate, copper lactate, copper benzoate, and others. However, inorganic copper salts can also be employed, provided they are sufficiently soluble in the starting materials forming the polyamides, and provided further that they are of sufficient thermal stability under the prevailing reaction conditions. These requirements are met by cupric chloride, cupric bromide, cupric sulfate, cupric nitrate, and by the ammonium complexes of these salts.

Suitable halogen-containing components for the manufacture of heat-stabilized polyamides are preferably hydrohalogenic acid salts of strong non-volatile organic bases. Such bases are considered strong bases whose dissociation constant is approximately $10^{-6}$ or higher. The term "non-volatile," as used herein, is understood as the bases in question having a boiling point of 100° C. or higher. However, these terms should not be construed as basically limiting the bases which may be employed. In certain instances, very high-boiling bases, e.g., aromatic or cycloaliphatic amines, can be used although their basicity is weaker than corresponds to a dissociation constant of $10^{-6}$. Conversely, stronger bases may be used even though their boiling point may lie somewhat below 100° C.

Ammonia, the simplest and most inexpensive base, in form of its hydrohalogenic acid salts, cannot be used for the purpose at hand because it volatilizes during the polycondensation, thereby leaving an excess acid in the polyamide melt which acid has a disturbing influence upon the polycondensation. However, a number of halogenides of quaternary ammonium bases can advantageously be used in the process according to the present invention. Such compounds include the chlorides, bromides and iodides of benzyltrimethylammonium hydroxide (Triton B), tetraethyl ammonium hydroxide, tetra-n-butyl ammonium hydroxide, tetraethanol ammonium hydroxide, hexamethylene-bis-trimethyl ammonium hydroxide, and other quaternary bases. Furthermore, the hydrohalogenic acid salts of piperazine, piperidine, benzylamine, morpholine, triisobutylamine, tri-n-propylamine, ethylene diamine, hexamethylene diamine, can be used.

The most favorable heat stabilizing effect is attained with the iodine salts of above bases. The bromides are almost as effective as the iodides, whereas the chlorides are much less effective. The copper salts and the halogenides of the organic bases are employed in concentrations up to approximately 0.2 percent, calculated on the polyamide. Increases in the dosage do not increase the heat stability (cf. Table 1). The addition of the stabilizers according to the present invention is best effected in the melt of the monomer, e.g., ε-caprolactam, ω-oenantholactam, aminoundecanic acid, or in the aqueous solution of the starting salt, e.g., hexamethylene diamine adipate, ethylene diamine sebacate, tetramethylene diamine suberate, etc. The stabilizers easily dissolve in all these starting materials and remain in the melt homogeneously during the polycondensation, regardless of whether the latter is carried out continuously or batchwise, with or without pressure.

The method of stabilization according to the present invention can also be applied when anhydrous or practically anhydrous lactams are polymerized, as for instance in the accelerated polymerization of ε-caprolactam in the presence of alkalis, or in the continuous polymerization under pressure with less than 0.4 percent water as a catalyst. In such instance, the copper component is dissolved in the lactam in form of an anhydrous salt.

The heat stabilizers also can be added at any convenient time during polymerization or polycondensation, or they can be added to the finished unstabilized polyamides which preferably should be in form of granules, e.g., by kneading them into the polymer in the extruder or at the calender. Sometimes, it is preferable not to mix the stabilizers by themselves with the polymer, but to use a polymer which contains a concentrate of the stabilizer.

The invention will now be explained further by means of the following examples. However, it should be understood that these are given merely by way of illustration, not of limitation, and that many changes in the details may be made without departing from the spirit of the present invention.

EXAMPLE 1

In a dissolving vessel, equipped with agitator, of a polymerizing unit, 250 kg. ε-caprolactam are dissolved in 20 liters of water at a temperature of 80–85° C. To this solution, a hot, filtered solution of 125 g. cupric acetate (containing 1 mol water of crystallization) in 1 l. water are added, followed by a hot, filtered solution of 500 g. hexamethylene-bis-trimethyl ammonium bromide in 1 l. water. The yellowish, but clear mixture is transferred by means of compressed nitrogen into an autoclave where it is polymerized in a known manner at 250° C. for 2.5 hours under pressure, followed by decompression and additional heating at 250° C. for 6 hours.

The contents of the autoclave then are poured in ribbon form and are solidified with cold water. The solidified ribbon is granulated, and the granules are treated with boiling water to remove remaining low-molecular constituents. The granules then are dried. Their relative solution viscosity in sulfuric acid is $\eta=2.50$. Test rods are extruded from these granules and are tested as to heat resistance in a circulating air oven. At a temperature of 150° C., embrittlement begins to set in after 1200 hours exposure. Rods made from unstabilized polycaprolactam embrittle after 2 hours exposure.

EXAMPLE 2

In the equipment described in Example 1, 200 kg. hexamethylene diamine adipate are dissolved in 80 l. water at 90–95° C. To this are added successively the hot, concentrated aqueous solutions of 100 g. cupric chloride (containing 2 mols water of crystallization) and 400 g. benzyltrimethyl ammonium iodide. The homogeneous mixture is polymerized in an autoclave at 280° C. for 3 hours under pressure and for another 6 hours without pressure. The contents of the autoclave is polyhexamethylene diammonium adipate of which a rope of 1 mm. thickness is removed and heated in a circulating air oven at 150° C. When this rope is wound around a mandrel of 1 mm. diameter during the oven exposure, cracks develop after 2400 hours heating. A rope of unstabilized polyamide under the same conditions cracks after 10 hours.

EXAMPLE 3

The equipment consists of a tube 6 m. long and of an inside diameter of 2.5 cm. It is set up for continuous polymerization under pressure of 60 atmospheres and at a temperature of 250° C. Into this equipment are introduced, by means of suitable pumps, 20 kg./h. ε-caprolactam containing 0.3 percent water, 0.02 percent anhydrous cupric acetate and 0.2 percent morpholinium iodide. At the lower end of the polymerization vessel, continuously 20 kg./h. polymer are drawn off in form of ropes which are cooled with water and granulated. After removal of low-molecular constituents with water (cf. Example 1), the polyamide has a relative solution viscosity in sulfuric acid of $\eta=2.85$.

Testing rods made from this material embrittle after 390 hours at 170° C. Unstabilized polycaprolactam embrittles under the same conditions after one-half hour.

EXAMPLE 4

In an autoclave, equipped with a high-speed agitator, 25 kg. absolutely anhydrous lactam are heated in a nitrogen atmosphere to 240° C. Through a charging valve, successively are added the hot, filtered solutions of 5 g. anhydrous cupric chloride in 100 g. anhydrous, molten caprolactam and of 25 g. tetra-n-butyl ammonium iodide in 100 g. anhydrous molten caprolactam. After 15 minutes of continued agitation, 25 g. metallic sodium, dispersed in 100 mol toluene, are added dropwise, whereby the polymerization begins instantly. After 30 minutes, the viscosity does not increase any longer, and the contents of the autoclave are drawn off in a nitrogen atmosphere in rope form into a cooling bath and thereafter granulated.

The polyamide thus obtained has a relative solution viscosity of $\eta=3.1$ and, after extraction and extrusion into test rods has a heat stability of 1700 hours at 150° C. as compared to 2 hours for unstabilized material.

Two different testing methods are employed for testing of the stabilized polyamides according to the present invention:

(1) The bending test on the ASTM standard tensile bar (Test method D 638–52T)

(2) The winding test according to U.S. Patent 2,705,227 on monofilaments of 1 mm. diameter.

The majority of the test samples is suspended freely in a drying oven allowing access of air from all sides and heated at 150° C. and 170 C., respectively. After a period of time corresponding to the degree of stabilization, 5 samples are removed from the oven and cooled to room temperature in a desiccator. For the bending test, the test rods are bent 180° by hand until the ends touch. If more than one sample breaks thereby, the material is considered defective, i.e., embrittled. In the winding test, the monofilament is wound around a steel mandrel of 1 mm. diameter so that each winding touches the next. The heating of this assembly is discontinued as soon as one of 5 samples shows cracks, visible through a magnifying glass.

Table 1 below gives the heat stability of several polyamides which have been treated according to the present invention, in comparison with untreated materials. The tests used are the ones described above, and in the table, B denotes the bending test, W the winding test.

Table 1 clearly shows that the heat stability of products made from polyamide can be increased 600 to 800 times by the treatment according to the present invention over untreated material. The stabilization imparts to the polyamide products a working life of an average of 3 months at 150° C. which corresponds to a working life of approximately 2 years at 120 ° C. This opens a number of end uses to heat stabilized polyamides in which resistance to elevated temperatures is required, such as conveyor belts for driers, sieves for hot bulk materials, gears, bearings and other transmission parts which move in hot oil, bristles for heat-cleaning installations, pipes for hot liquids, etc.

Table I

HEAT STABILITIES IN DEPENDENCE OF KIND AND QUANTITY OF HEAT STABILIZER USED

| Polyamide | Stabilizers | | Heat Stability (Hours) | | | |
|---|---|---|---|---|---|---|
| | Copper Component | Halogen Component | 150° C. | | 170° C. | |
| | | | B | W | B | W |
| Polycaprolactam | | | 2 | 3 | 0.5 | 1 |
| Do | Cupric Acetate 0.05% | | 100 | 144 | 24 | 30 |
| Do | | Triton B-Iodohydrate 0.2% | 200 | 240 | 48 | 72 |
| Do | Cupric Acetate 0.05 | do | 1,680 | 2,400 | 384 | |
| Do | Cupric Acetate 0.1% | do | 1,680 | 2,400 | 408 | |
| Do | Cupric Acetate 0.01% | do | 1,560 | 2,280 | 336 | |
| Do | Cupric Acetate 0.3% | do | 1,560 | 2,280 | 360 | |
| Do | Cupric Acetate 0.05% | Triton B-Iodohydrate 0.5% | 1,680 | 2,400 | 384 | |
| Do | do | Triton B-Iodohydrate 0.05% | 1,320 | 2,040 | 288 | |
| Polyhexamethylene | Cupric Chloride 0.05% | Morpholiniumiodide 0.2% | 1,800 | 2,376 | | 624 |
| Diammonium Adipate | do | Morpholiniumiodide 0.5% | 1,800 | 2,376 | | 624 |
| Do | Cupric Chloride 0 | Morpholiniumiodide 0 | 4 | 10 | 1 | 2.5 |
| Polyaminoundecanic Acid | Cupric Sulfate 0.01% | Tetra-n-butyl-ammonium-iodide 0.2%. | 1,800 | 2,640 | | 696 |
| Do | Cupric Sulfate 0.02 | do | 1,920 | 2,880 | | 648 |
| Do | Cupric Sulfate 0 | Tetra-n-butyl-ammonium-iodide 0. | 7.5 | 15 | 2 | 4 |

The forming and shaping capability of the polyamides stabilized according to the present invention is not diminished in any way. The polyamides can be spun into filaments from hot melts, which filaments can be fabricated into faultless endless yarns or staple fibers. Likewise, extrusion into rods, tubing, film, pipes and other profiles is as easily accomplished as with the unstabilized material. Finally, the stabilized polyamides can also be injection molded, pressed, poured and sintered using the corresponding commercial equipment which needs no alterations. The stabilizers incorporated in the polyamides do not require different working conditions from the unstabilized materials.

What we claim is:

1. A shaped article substantially of a polymer selected from the group consisting of polycaprolactam, polyhexamethylene diammonium adipate, polyundecanic acid and copolymers thereof, which comprises 0.05 to 3 percent of a copper salt, selected from the group consisting of copper acetate, copper propionate, copper butyrate, copper stearate, copper lactate, copper benzoate, cupric chloride, cupric bromide, cupric sulfate, cupric nitrate and the ammonium complexes of cupric chloride, bromide, sulfate and nitrate; and 0.05 to 0.2 percent of a salt formed of a member of the group, consisting of a hydrobromide and a hydroiodide, with a member of the group consisting of piperazine, piperidine, benzyl amine, morpholine, triisobutyl amine, tri-n-propyl amine, ethylene diamine, hexamethylene diamine, benzyl trimethyl ammonium hydroxide, tetraethyl ammonium hydroxide, tetra-n-butyl ammonium hydroxide, and hexamethylene-bis-trimethyl ammonium hydroxide; said salt having a dissociation constant of more than $10^{-6}$; incorporated in the molecule of said polymer.

2. A process for the manufacture of heat- and oxygen-resistant articles from polymers selected from the group consisting of polycaprolactam, polyhexamethylene diammonium adipate, polyaminoundecanic acid and copolymers thereof, which comprises shaping said articles in the presence of stabilizing additives consisting of 0.05 to 0.3 percent of a copper salt, selected from the group consisting of copper acetate, copper propionate, copper butyrate, copper stearate, copper lactate, copper benzoate, cupric chloride, cupric bromide, cupric sulfate, cupric nitrate and the ammonium complexes of cupric chloride, bromide, sulfate and nitrate; and 0.05 to 0.2 percent of a salt formed of a member of the group, consisting of a hydrobromide and a hydroiodide, with a member of the group consisting of piperazine, piperidine, benzyl amine, morpholine, triisobutyl amine, tri-n-propyl amine, ethylene diamine, hexamethylene diamine, benzyl trimethyl ammonium hydroxide, tretraethyl ammonium hydroxide, tetra-n-butyl ammonium hydroxide, and hexamethylene-bis-trimethyl ammonium hydroxide; said salt having a dissociation constant of more than $10^{-6}$.

3. The process according to claim 2, wherein said additives are mixed with the substance forming the polyamide before polymerization.

4. The process according to claim 2, wherein said additives are mixed with the substance forming the polyamide during polymerization.

5. The process according to claim 2, wherein the said additives are mixed with the polyamide after polymerization.

References Cited in the file of this patent

UNITED STATES PATENTS 2,705,227    Stamatoff    Mar. 29, 1955

FOREIGN PATENTS 883,644    Germany    July 20, 1953